(12) United States Patent
Allen et al.

(10) Patent No.: US 7,631,791 B1
(45) Date of Patent: *Dec. 15, 2009

(54) SWING-OUT HITCH MOUNTED EQUIPMENT CARRIER

(75) Inventors: Alexander R. Allen, Marion, MA (US); Richard A. Allen, Concord, MA (US)

(73) Assignee: R.A. Allen Company, Inc., Vero Beach, FL (US)

( * ) Notice: Subject to any disclaimer, the term of this patent is extended or adjusted under 35 U.S.C. 154(b) by 659 days.

This patent is subject to a terminal disclaimer.

(21) Appl. No.: 11/071,341

(22) Filed: Mar. 3, 2005

Related U.S. Application Data

(63) Continuation-in-part of application No. 10/833,874, filed on Apr. 28, 2004, now Pat. No. 7,261,229.

(51) Int. Cl.
*B60R 9/00* (2006.01)

(52) U.S. Cl. .................. 224/503; 519/529; 519/531; 519/505; 519/506

(58) Field of Classification Search .............. 224/53, 224/505, 506, 508, 518, 519, 495, 497, 503, 224/525, 529, 531, 532, 924, 502, 504, 507, 224/282
See application file for complete search history.

(56) References Cited

U.S. PATENT DOCUMENTS

| | | | | |
|---|---|---|---|---|
| 4,717,054 A | * | 1/1988 | Vanzant | 224/506 |
| 5,518,159 A | * | 5/1996 | DeGuevara | 224/502 |
| 5,647,521 A | * | 7/1997 | Burgess | 224/505 |
| 5,664,717 A | * | 9/1997 | Joder | 224/502 |
| 5,685,686 A | * | 11/1997 | Burns | 224/519 |
| 5,730,345 A | * | 3/1998 | Yeckley et al. | 224/505 |
| 5,845,832 A | * | 12/1998 | Eichmann | 224/509 |
| 6,126,053 A | * | 10/2000 | Shaver | 224/509 |

\* cited by examiner

*Primary Examiner*—Nathan J Newhouse
*Assistant Examiner*—Lester L Vanterpool
(74) *Attorney, Agent, or Firm*—Herbert L. Bello

(57) ABSTRACT

A swing-out hitch mounted equipment carrier that is movable between collapsed and extended positions has a rectangular insert that is sized and shaped to be received in a trailer hitch receiver affixed to a vehicle. A fixed arm is attached to the insert. A swing arm is pivotally connected to the fixed arm. A vertical member having an equipment carrier affixed on an upper end is pivotally connected at a lower end to the swing arm. The vertical member is constrained for rotational movement about its longitudinal axis, the equipment carrier rotating with the vertical member. A controller is provided for controlling the ratio of the relative movement of the swing arm and equipment carrier as the swing-out hitch mounted equipment carrier is moved between the collapsed and extended positions.

19 Claims, 4 Drawing Sheets

SWING-OUT HITCH MOUNTED EQUIPMENT CARRIER

CROSS-REFERENCE TO RELATED APPLICATIONS

This is a continuation-in-part of Ser. No. 10/833,874, filed on Apr. 28, 2004 now U.S. Pat. No. 7,261,229, for a Swing-Away Hitch Mounted Equipment Carrier.

BACKGROUND OF THE INVENTION

1. Field of Invention

The present invention relates to hitch mounted equipment carriers that are configured to be attached to motor vehicles, and, more particularly, the invention is directed toward a swing-out hitch mounted equipment carrier with a pivotally mounted swing arm, a vertical member is rotatably connected to the swing arm and an equipment carrier is mounted on the vertical member. A control member is provided for controlling the pivoting movement of the swing arm and the rotational movement of the equipment carrier as the hitch mounted equipment carrier is moved from a closed position to an opened position.

2. Description of the Prior Art

A variety of hitch mounted equipment carriers that are configured to be mounted to motor vehicles by means of trailer hitch receivers are available in the prior art. Examples of hitch mounted equipment carriers that are attachable to trailer hitch receivers are shown in U.S. Pat. Nos. 5,664,717; 5,845,832; 5,454,496; 6,123,498; 6,386,410 and 6,644,525.

Typically, pivoting hitch mounted equipment carriers have a rectangular base tube that is received in a trailer hitch receiver which is attached to a passenger vehicle. One end of a fixed arm is attached to the base tube and one end of a swing arm is pivotally connected to a free end of the fixed arm. A vertical upright member is attached to a free end of the swing arm. The vertical upright member is fixed against rotational movement relative to the swing arm. An equipment carrier, for example, a bicycle carrier, is mounted on the top of the vertical upright member. The bicycle carrier, which is configured to carry one or more bicycles, is fixed against rotational movement relative to the vertical upright member. Therefore, there was no way to rotate the bicycles relative to the swing arm. These hitch mounted equipment carriers have a relatively long swing arm in order to provide adequate clearance so that the bicycles mounted thereon do not interfere with the opening of the vehicle's rear door when the hitch mounted equipment carrier is opened. Accordingly, pivoting hitch mounted equipment carriers of this type have been met with varying degrees of success because they are cumbersome to use.

The vertical upright member of the pivoting hitch mounted equipment carrier shown in U.S. Pat. No. 5,664,717 is rotatably mounted to the swing arm and the carrying member is fixed to the vertical upright member. In U.S. Pat. No. 6,123,498, the vertical upright member is fixed to the swing arm and the carrying member is rotatably mounted to the vertical upright member. In each of these pivoting hitch mounted equipment carriers, the carrying member is free to rotate relative to the swing arm. Accordingly, a user can manually rotate the bicycles through an arc of ninety degrees relative to the back of the vehicle as the user moves the hitch mounted equipment carrier from its closed position to its opened position. Pivoting hitch mounted equipment carriers of this type have been met with varying degrees of success because there is nothing to control the movement of the bicycles through this ninety-degree arc as the hitch mounted equipment carrier is being opened, and the bicycles can swing into the user's vehicle.

Other prior art hitch mountable equipment carriers suffer from the limitation that it is difficult to securely fasten the bicycles to the hitch mounted equipment carrier because of the unwanted movement of the carrying member as the bicycles are placed and secured thereon.

A need has arisen for an improved, pivoting hitch mounted equipment carrier that does not suffer from aforementioned limitations and disadvantages.

SUMMARY OF THE INVENTION

An object of the present invention is to overcome the aforementioned limitations and disadvantages of prior art pivoting hitch mounted equipment carriers.

Another object of the present invention is to provide a swing-out hitch mounted equipment carrier that is movable between a closed or collapsed position and an opened or extended position while maintaining control of the position of items carried on the hitch mounted equipment carrier.

A further object of the invention is to provide a swing-out hitch mounted equipment carrier having a swing arm, an equipment carrier and a control member, the control member controlling relative rotational movement of the swing arm and equipment carrier as the hitch mounted equipment carrier is moved between the collapsed and extended positions.

Yet another object of the invention is to provide a swing-out hitch mounted equipment carrier having a rotatable swing away arm, a rotatable equipment carrier and a controller, the combination of elements being such that the ratio of relative rotatable movement of the swing away arm and the equipment carrier is approximately 2:1 as the hitch mounted equipment carrier is moved between the collapsed and extended positions.

A collapsible and extendable swing-out hitch mounted equipment carrier embodying the present invention for carrying equipment at the rear of a vehicle has a rectangular insert that is sized and shaped to be received in a hitch receiver affixed to the vehicle. A fixed arm is attached to the insert. A swing arm is pivotally connected to the fixed arm. A vertical member having an equipment carrier affixed on an upper end is connected at a lower end to the swing arm by means of a hinge bracket. One end of a control member is pivotally mounted to the swing arm and an opposite end of the control member is pivotally mounted to the hinged bracket. The vertical member is constrained for rotational movement about its longitudinal axis, the equipment carrier rotating with the vertical member. The pivotally mounted control member is provided for controlling the pivoting movement of the swing arm and the rotational movement of the vertical member and the equipment carrier when the swing-out hitch mounted equipment carrier is moved between the collapsed and extended positions.

In the collapsed position, the swing arm is in juxtaposition with the fixed arm. In the preferred embodiment, as the hitch mounted equipment carrier is moved from the collapsed position to the extended position, the swing arm is pivotally moved in a counterclockwise direction and the equipment carrier rotates counterclockwise. In the fully extended position, the equipment carrier has moved through an arc of approximately one hundred and eighty degrees and has rotated approximately ninety degrees toward the side of the vehicle.

Other general and specific objects, features and advantages of the invention will in part be obvious and will in part appear hereinafter.

BRIEF DESCRIPTION OF THE DRAWINGS

An understanding of the nature and objects of the present invention will become more readily apparent upon consideration of the following detailed description taken in connection with the accompanying drawings, wherein.

DETAILED DESCRIPTION OF THE INVENTION

Figure 1:
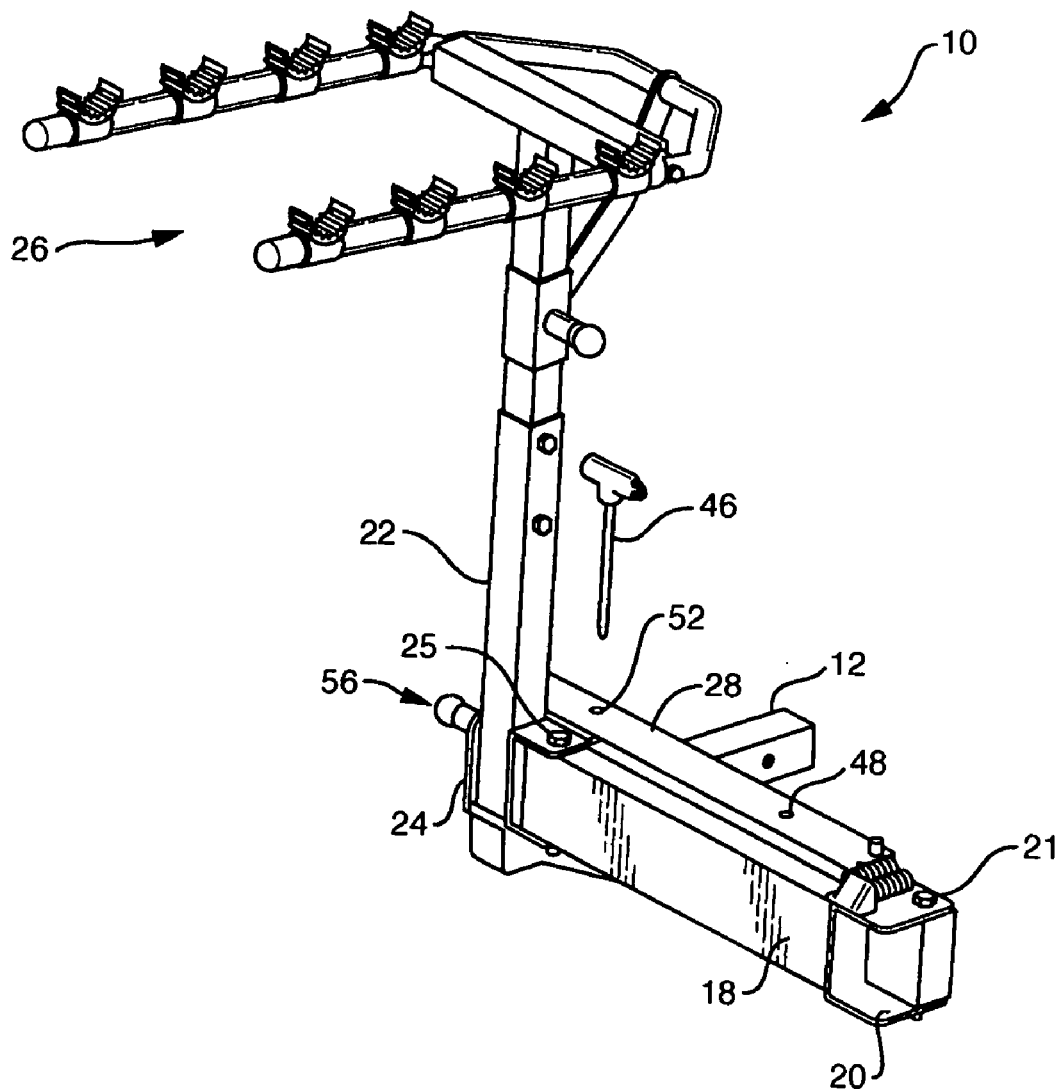
FIG. 1 is a perspective view of a swing-out hitch mounted equipment carrier embodying the invention in a closed position.
Figure 2:
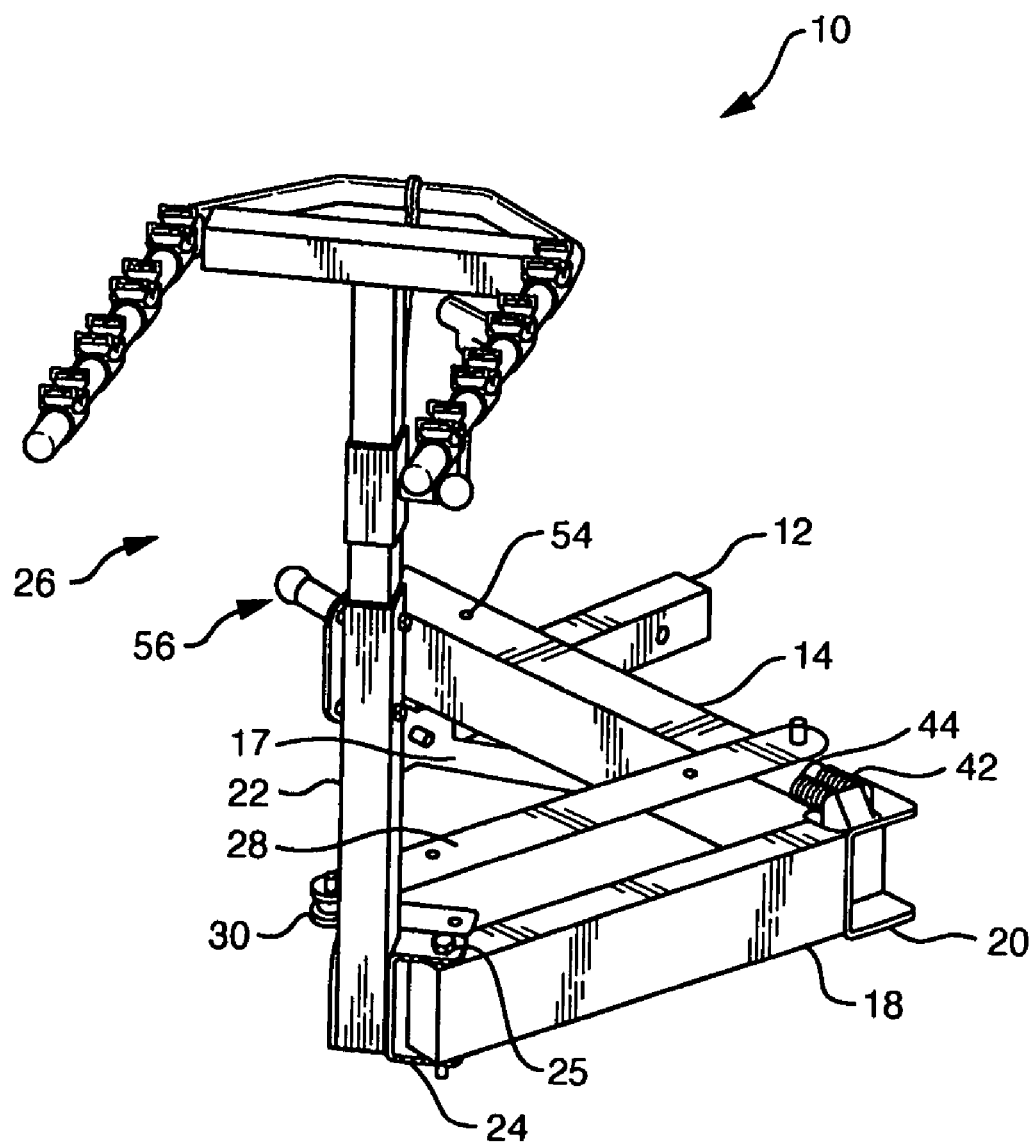
FIG. 2 is a perspective view of the swing-out carrier of FIG. 1 in a position that is midway between the closed position and an opened position.

Referring now to the drawings, particularly FIG. 1, there is shown a swing-out hitch mounted equipment carrier 10 embodying the invention that is configured to be detachably mounted to a vehicle having a trailer hitch receiver (not shown). Swing-out hitch mounted equipment carrier 10 includes a generally horizontal insert 12 that is sized and shaped to be snugly received in the trailer hitch receiver. As hereinafter described, hitch mounted equipment carrier 10 is movable between a closed or collapsed position shown in FIG. 1, a midway position in FIG. 2 and an opened or extended position shown in FIG. 3.

Figure 3:
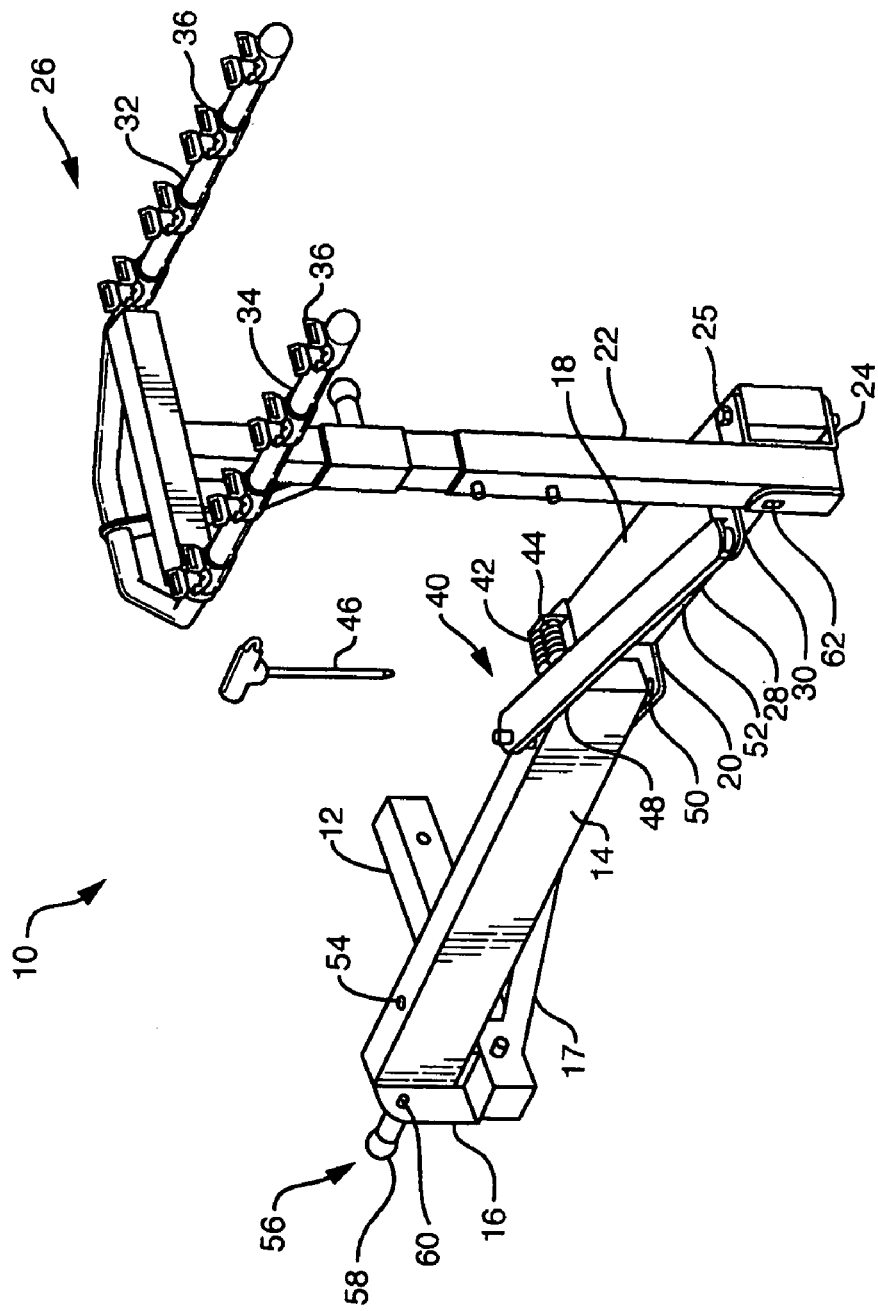
FIG. 3 is a perspective view of the swing-out carrier of FIG. 1 in its opened position.

As best shown in FIG. 3, hitch mounted equipment carrier 10 includes a fixed arm 14 that is attached to insert 12 by means of a bracket 16. A support bracket 17, which is connected to insert 12 and fixed arm 14, provides additional support for the attachment of the insert and the fixed arm. One end of a swing arm 18 is pivotally mounted to a free end of the fixed arm 14 by means of a first hinge bracket 20 that pivots about a hinge pin 21. A lower end of a vertical member 22 is rotatably mounted to a free end of the swing arm 18 by means of a second hinge bracket 24 that pivots about a hinge pin 25. An equipment carrier 26 is mounted to an upper end of the vertical member 22. As shown in parent application Ser. No. 10/833,874, incorporated herein by reference, equipment carrier 26 is movable between a collapsed or storage position and an extended or operational position. For convenience, only the extended or operational position is shown in this application.

Opposite ends of a control member 28 are pivotally connected to the fixed arm 14 and an extending finger 30 of the second hinge bracket 24. Movement of the swing arm 18 relative to the fixed arm 14 is governed by the control member 28. The vertical member 22 is mounted to the second hinge bracket 24, the second hinge bracket being rotatably connected to a free end of the swing arm 18. Rotational movement of the vertical member 22 is governed by the control member 28. The equipment carrier 26, for example, the collapsible carrier described in U.S. Pat. No. 6,644,525, incorporated herein by reference, is shown in its opened or operational position in FIGS. 1, 2 and 3.

The equipment carrier 26, for example, a bicycle carrier, includes a pair of carrying arms 32 and 34, each carrying arm being provided with holders or saddles 36. The carrying arms 32,34 are configured to carry one or more bicycles (not shown), the bicycles being secured to the carrying arms by means of the holders 36. In the illustrated embodiment, the equipment carrier 26 is secured to the top of the vertical member 22 and fixed against rotational movement relative to the vertical member. Accordingly, the carrying arms 32,34 and the bicycles mounted thereon rotate with the rotational movement of the vertical member 22. In an alternate embodiment, the control member 28 is operatively connected to the equipment carrier 26 and controls the rotational movement of the equipment carrier as the hitch mounted equipment carrier 10 is moved between its closed and extended positions. In the illustrated embodiment, by way of example, the length of fixed arm 14 and the length of swing arm 18 is such that a bicycle mounted on the equipment carrier 26 is moved to the side of the vehicle when hitch mounted equipment carrier 10 is in its extended position shown in FIG. 3.

A shock absorbing member 40 is mounted to the first hinge bracket 20. Shock absorbing member 40, for example a pair of springs 42,44, acts as a shock absorber and a stop for limiting movement of swing-out hitch mounted equipment carrier 10 as it is moved to the opened position by engaging control member 28. In an alternate embodiment, shock absorbing member is composed of a resilient material, for example, rubber or a plastic.

As best shown in FIG. 3, a locking pin 46, which is sized and shaped to be removably received in a hole 48 in control member 28 and a hole 50 in first hinge bracket 20 is provided for holding the swing-out hitch mounted equipment carrier 10 in its opened position. As best shown in FIGS. 1 and 3, locking pin 46 is sized and shaped to be removably received in a hole 52 in control member 28 and a hole 54 in fixed arm 14 for holding the swing-out hitch mounted equipment carrier 10 in its closed position.

As previously noted, the swing-out hitch mounted equipment carrier 10 is movable between a closed or collapsed position and an opened or extended position. As the swing-out hitch mounted equipment carrier 10 is moved from its closed position to its opened position, the swing arm 18 pivots in the first hinge bracket 20 and the second hinge bracket 24. The pivoting movement of the swing arm 18 causes the second hinge bracket 24 to pivot. Pivoting movement of the second hinge bracket 24 causes the vertical member 22 to rotate, the vertical member being fixed to the second hinge bracket. Rotational movement of the vertical member 22 results in rotational movement of the equipment carrier 26 and the carrying arms 32,34. Accordingly, when the swing-out hitch mounted equipment carrier 10 is moved counterclockwise through an arc of approximately one hundred and eighty degrees from its closed position shown in FIG. 1 to its opened position shown in FIG. 3, the vertical member 22 and the carrying arms 32,34 have traveled counterclockwise and have rotated counterclockwise approximately ninety degrees. The carrying arms 32,34 have traveled from an initial rearwardly pointing position at the back of the vehicle to a final resting position at one side of the back of the vehicle. In the final resting position, the bicycles carried on carrying arms 32,34 are positioned approximately parallel to the side of the vehicle. Locking pin 46 is inserted into holes 48 and 50 for locking the swing-out hitch mounted equipment carrier 10 in its opened position. Locking pin 46 is removed from holes 48 and 50 for moving the swing-out hitch mounted equipment carrier 10 to its closed position.

A spring loaded pull pin 56 that is mounted to bracket 16, best shown in FIG. 3, is provided for holding swing-out hitch mounted equipment carrier 10 in its closed position. Pull pin 56 has an enlarged head 58 and an extending finger 60. Head 58 is pulled away from bracket 16 and finger 60 retracts to permit the swing-out hitch mounted equipment carrier 10 to move to its closed position. Once the swing-out hitch mounted equipment carrier 10 has moved to its closed position, head 58 is released and finger 60 is received in an opening 62 in second hinge bracket 24 for securing the swing-out hitch mounted equipment carrier 10 in its closed position. In addition, locking pin 46 is inserted into holes 52 and 54 for further securing the swing-out hitch mounted equipment carrier 10 in its closed position. When the swing-out hitch mounted equipment carrier 10 is moved clockwise from its opened position shown in FIG. 3 to its closed position shown in FIG. 1, the carrying arms 32,34 rotate approximately ninety degrees clockwise from its position at the side of the vehicle to its rearwardly pointing position at the rear of the vehicle.

From the foregoing, it will be appreciated that the arrangement of elements is such that the ratio of the relative rotational movement of first hinge bracket 20 to second hinge bracket 24 is approximately 2:1 and the ratio of relative rotational movement of swing arm 18 and equipment carrier 26 is approximately 2:1. As first hinge bracket 20 moves through an arc of approximately one hundred and eighty degrees, second hinge bracket 24 moves through an arc of approximately ninety degrees. As swing arm 18 moves through an arc of approximately one hundred and eighty degrees, equipment carrier 26 moves through an arc of approximately ninety degrees. Accordingly, swing arm 18 moves through an arc of approximately one hundred and eighty degrees as swing-out hitch mounted equipment carrier 10 moves from its closed or collapsed position to its opened or extended position and equipment carrier 26 moves through an arc of approximately ninety degrees as swing-out hitch mounted equipment carrier 10 moves from its closed or collapsed position to its opened or extended position.

Figure 4:
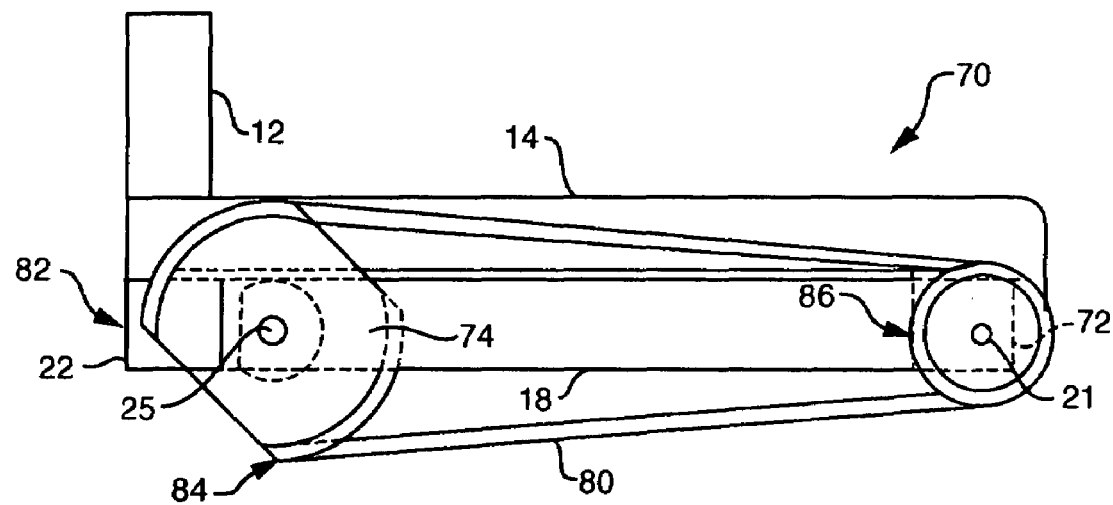
FIG. 4 is a schematic diagram showing a first alternate embodiment of the invention.

Referring now to FIG. 4, there is shown an alternate embodiment of the invention in which the relative rotational movement of swing arm 18 and equipment carrier 26 is controlled by means other than control member 28. In the alternate embodiment of FIG. 4, relative rotational movement of swing arm 18 and equipment carrier 26 is governed by a pulley arrangement 70 that includes a first pulley 72 and a second pulley 74. In order to obtain the approximately 2:1 ratio of relative rotational movement of swing arm 18 and equipment carrier 26, the diameter of second pulley 74 is approximately two times the diameter of first pulley 72. First pulley 72 is attached to fixed arm 14 at hinge pin 21 and fixed against rotational movement. Second pulley 74 is connected to vertical member 22 and rotatably movable on swing arm 18 about hinge pin 25. Opposite ends of a flexible control member 80 are attached to second pulley 74 at the "X" notations denoted by reference characters 82 and 84. Control member 80 is double wrapped about first pulley 72 and attached thereto at the "X" notation at reference character 86. As swing arm 18 rotates counterclockwise from its closed position to its opened position, control member 80 causes second pulley 74 to rotate clockwise relative to the swing arm. Since the diameter of second pulley 74 is approximately twice the diameter of first pulley 72, as swing arm 18 moves counterclockwise through an arc of approximately one hundred and eighty degrees, swing-out hitch mounted equipment carrier 10 moving from its closed or collapsed position to its opened or extended position, equipment carrier 26 moves clockwise through an arc of approximately ninety degrees. A further embodiment of the present invention is shown in FIG. 5.

Figure 5:
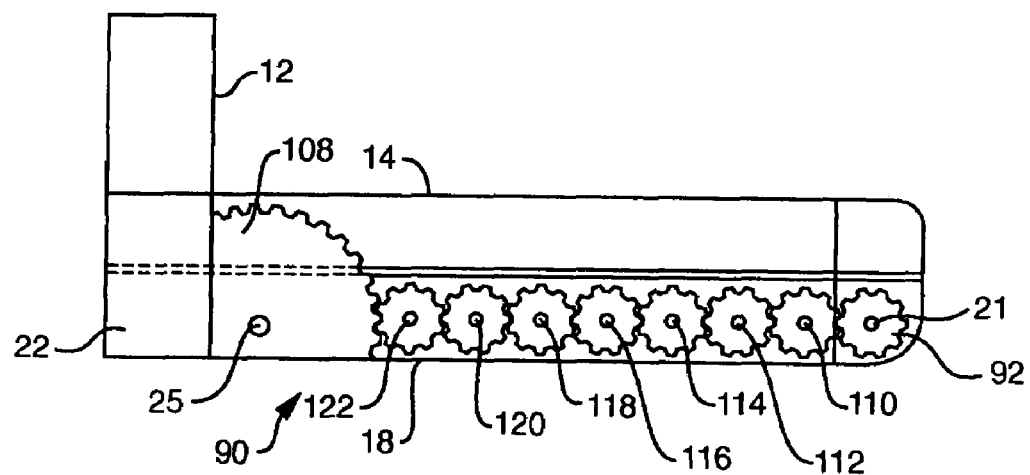
FIG. 5 is a schematic diagram showing a second alternate embodiment of the invention.

Referring now to FIG. 5, there is shown an alternate embodiment of the invention in which the relative rotational movement of swing arm 18 and equipment carrier 26 is controlled by means other than control member 28 or pulley arrangement 70. In the alternate embodiment of FIG. 5, relative rotational movement of swing arm 18 and equipment carrier 26 is governed by a gear assembly 90 that includes a fixed gear 92, idler gears 94, 96, 98, 100, 102, 104 and 106, and a quadrant gear 108. In order to obtain the approximately 2:1 ratio of relative rotational movement of swing arm 18 and equipment carrier 26, the radius of quadrant gear 108 is approximately twice the radius of fixed gear 92. In the illustrated embodiment, fixed gear 92 and idler gears 94, 96, 98, 100, 102, 104 and 106 are the same size and shape. Fixed gear 92 is attached to fixed arm 14 at hinge pin 21 and fixed against rotational movement. Idler gears 94, 96, 98, 100, 102, 104 and 106 are rotatably mounted to swing arm 18 by means of hinge pins 110, 112, 114, 116, 118, 120 and 122, respectively, that are attached to the swing arm. Quadrant gear 108 is connected to vertical member 22 and rotatably movable on swing arm 18 about hinge pin 25. As swing arm 18 rotates counterclockwise from its closed position to its opened position, idler gear 94 rotates counterclockwise, idler gear 96 rotates clockwise, idler gear 98 rotates counterclockwise, idler gear 100 rotates clockwise, idler gear 102 rotates counterclockwise, idler gear 104 rotates clockwise and idler gear 106 rotates counterclockwise. Counterclockwise rotation of idler gear 106 causes quadrant gear 108 and vertical member 22 to rotate clockwise. Since the radius of quadrant gear 108 is approximately twice the radius of fixed gear 92, as swing arm 18 moves counterclockwise through an arc of approximately one hundred and eighty degrees, swing-out hitch mounted equipment carrier 10 moving from its closed or collapsed position to its opened or extended position, equipment carrier 26 moves clockwise through an arc of approximately ninety degrees.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A collapsible swing-out hitch mounted equipment carrier that is configured to be detachably mounted to a vehicle, the swing-out hitch mounted equipment carrier movable between a collapsed position and an extended position, the swing-out hitch mounted equipment carrier comprising:
    (a) a securing means for securing the swing-out hitch mounted equipment carrier to the vehicle;
    (b) a fixed arm attached to said securing means;
    (c) a swing arm;
    (d) a first hinge means attached to said fixed arm and one end of said swing arm, said first hinge means permitting pivotal movement of said swing arm relative to said fixed arm;
    (e) an upright vertical member;
    (f) a second hinge means connected to a free end of said swing arm and said upright vertical member, said second hinge means permitting rotational movement of said upright vertical member about a substantially vertical axis relative to said swing arm;
    (g) an equipment carrier attached to said upright vertical member;
    (h) a control member means in the form of a bar, said control member means having first and second ends, said first end of said control member means pivotally connected to said fixed arm and said second end of said control member means pivotally connected to said second hinge means, said control member means controlling the pivotal movement of said swing arm relative to said fixed arm and rotational movement of said equipment carrier relative to said swing arm, said upright vertical member maintained in an upright position when the collapsible swing-out hitch mounted equipment carrier is moved between its collapsed position and its extended position; and (i) a locking means for locking the collapsible swing-out hitch mounted equipment carrier in its collapsed position and in its extended position.

2. The collapsible swing-out hitch mounted equipment carrier as claimed in claim 1 wherein said second hinge means has an extending finger, said second end of said control member means is pivotally connected to said extending finger.

3. The collapsible swing-out hitch mounted equipment carrier as claimed in claim 1 wherein said locking means includes a locking pin and wherein said control member means includes a first through hole adjacent its said first end and a second through hole adjacent its said second end, and wherein said fixed arm includes a third through hole that is in registration with said second through hole when the collapsible swing-out hitch mounted equipment carrier is in its collapsed position and wherein said first hinge means includes a fourth through hole that is in registration with said first through hole when the collapsible swing-out hitch mounted equipment carrier is in its extended position, said locking pin being sized and shaped to fit into said first, second, third and fourth through holes.

4. A collapsible swing-out hitch mounted equipment carrier that is configured to be detachably mounted to a trailer hitch receiver that is attached to a vehicle, the swing-out hitch mounted equipment carrier movable between a collapsed position and an extended position, the swing-out hitch mounted equipment carrier comprising:

(a) an insert that is sized and shaped to be received in the trailer hitch receiver;

(b) a fixed arm, one end of said fixed arm is attached to said insert;

(c) a swing arm, one end of said swing arm is pivotally connected to a free end of said fixed arm, said swing arm constrained for pivotal movement in a substantially horizontal plane;

(d) a bracket pivotally attached to a free end of said swing arm;

(e) an equipment carrier operatively connected to said bracket, said equipment carrier rotating about a substantially vertical axis with pivotal movement of said bracket; and (f) a control member in the form of a bar having first and second ends, said first end of said control member is pivotally connected to said fixed arm, said second end of said control member is pivotally connected to said bracket, said control member governing pivoting movement of said swing arm relative to said fixed arm and rotational movement of said equipment carrier relative to said swing arm; and (g) a locking means for locking the collapsible swing-out hitch mounted equipment carrier in its collapsed position and in its extended position.

5. A collapsible swing-out hitch mounted equipment carrier that is configured to be detachably mounted to a vehicle, the swing-out hitch mounted equipment carrier movable between a closed position and an opened position, the swing-out hitch mounted equipment carrier comprising:

(a) a securing means for securing the swing-out hitch mounted equipment carrier to the vehicle;

(b) a fixed arm having first and second ends, said securing means securing said first end of said fixed arm to the vehicle;

(c) a first hinge bracket;

(d) a swing arm having first and second ends, said first hinge bracket pivotally connecting said first end of said swing arm to said second end of said fixed arm, said swing arm constrained for movement in a substantially horizontal plane, said swing arm in juxtaposition with said fixed arm when the swing-out hitch mounted equipment carrier is in the closed position;

(e) a second hinge bracket with an extending finger is pivotally mounted to said swing arm at said second end thereof;

(f) a vertical member having upper and lower ends, said lower end of said vertical member is operatively connected to said second hinge bracket, said vertical member constrained for rotating movement about a substantially vertical axis, said vertical member rotating with pivotal movement of said second hinge bracket, said vertical member rotating when the swing-out hitch mounted equipment carrier is moved between the closed and opened positions;

(g) an equipment carrier attached to said vertical member; and (h) a control member means operatively connected to said fixed arm and said extending finger of said second hinge bracket, said control member means being an elongated bar, said control member means controlling the pivotal movement of said swing arm and rotational movement of said vertical member and said equipment carrier when the swing-out hitch mounted equipment carrier is moved between the closed and opened positions; and (g) a locking means for locking the swing-out hitch mounted equipment carrier in the closed position and in the opened position.

6. The swing-out hitch mounted equipment carrier as claimed in claim 5 wherein said equipment carrier is a bicycle carrier having a pair of carrying arms, said bicycle carrier mounted at said upper end of said vertical member.

7. The swing-out hitch mounted equipment carrier as claimed in claim 5 wherein one end of said first hinge bracket is connected to said fixed arm and an opposite end of said first hinge bracket is connected to said first end of said swing arm, said first hinge bracket permitting said swing arm to pivotally move relative to said fixed arm.

8. A collapsible swing-out hitch mounted equipment carrier that is configured to be detachably mounted to a vehicle, the swing-out hitch mounted equipment carrier movable between a closed position and an opened position, the swing-out hitch mounted equipment carrier comprising:

(a) a securing means for securing the swing-out hitch mounted equipment carrier to the vehicle;

(b) a fixed arm having first and second ends, said securing means securing said first end of said fixed arm to the vehicle;

(c) a first hinge bracket;

(d) a swing arm having first and second ends, said first hinge bracket pivotally connecting said first end of said swing arm to said second end of said fixed arm, said swing arm constrained for movement in a substantially horizontal planes said swing arm in juxtaposition with said fixed arm when the swing-out hitch mounted equipment carrier is in the closed position;

(e) a second hinge bracket with an extending finger is pivotally mounted to said swing arm at said second end thereof;

(f) a vertical member having upper and lower ends, said lower end of said vertical member is operatively connected to said second hinge bracket, said vertical member constrained for rotating movement about a substantially vertical axis, said vertical member rotating with pivotal movement of said second hinge bracket, said vertical member rotating when the swing-out hitch mounted equipment carrier is moved between the closed and opened positions;

(g) an equipment carrier attached to said vertical member;

(h) a control member means in the form of an elongated bar, said control member means operatively connected to said fixed arm and said extending finger of said second hinge bracket, said control member means controlling the pivotal movement of said swing arm and rotational movement of said vertical member and said equipment carrier when the swing-out hitch mounted equipment carrier is moved between the closed and opened positions;

(i) one end of said first hinge bracket is connected to said fixed arm and an opposite end of said first hinge bracket is connected to said first end of said swing arm, said first hinge bracket permitting said swing arm to pivotally move relative to said fixed arm; and (j) a locking means for locking the collapsible swing-out hitch mounted equipment carrier in the closed position and in the opened position.

9. A swing-out hitch mounted equipment carrier that is configured to be detachably mounted to a trailer hitch receiver that is attached to a vehicle, the swing-out hitch mounted equipment carrier movable between a collapsed position and an extended position, the swing-out hitch mounted equipment carrier comprising:

(a) a securing means for securing the swing-out hitch mounted equipment carrier to the trailer hitch receiver;

(b) a fixed arm having first and second ends, said securing means securing said first end of said fixed arm to the vehicle;

(c) a swing arm having first and second ends, said first end of said swing arm pivotally connected to said second end of said fixed arm, said swing arm constrained for movement in a substantially horizontal plane, said swing arm in juxtaposition with said fixed arm when the swing-out hitch mounted equipment carrier is in the collapsed position;

(d) a bracket pivotally connected to said second end of said swing arm;

(e) an equipment carrier operatively connected to said bracket, said equipment carrier rotating with pivotal movement of said bracket;

(f) a control member in the form of an elongated bar having first and second ends, said first end of said control member pivotally connected to said fixed arm, said second end of said control member operatively connected to said swing arm, said control member controlling the pivotal movement of said swing arm relative to said fixed arm as the swing-out hitch mounted equipment carrier is moved between the collapsed and the extended positions; and (g) a locking means for locking the swing-out hitch mounted equipment carrier in the collapsed position and in the extended position.

10. The swing-out hitch mounted equipment carrier as claimed in claim 9 wherein said bracket has an extending finger, said second end of said control member means is pivotally connected to said extending finger, said control member controlling the pivotal movement of said swing arm and rotational movement of said equipment carrier as the swing-out hitch mounted equipment carrier is moved between the collapsed and the extended positions.

11. The swing-out hitch mounted equipment carrier as claimed in claim 10 wherein said equipment carrier is a bicycle carrier having a pair of carrying arms.

12. The swing-out hitch mounted equipment carrier as claimed in claim 10 including another bracket, one end of said another bracket is connected to said fixed arm and an opposite end of said another bracket is connected to said first end of said swing arm, said another bracket pivotally connecting said swing arm to said fixed arm.

13. The collapsible swing-out hitch mounted equipment carrier as claimed in claim 12 including a locking means for locking the swing-out hitch mounted equipment carrier in the collapsed position and in the extended position, said locking means including a locking pin and first, second, third and fourth through holes, said first through hole formed in said control member adjacent its said first end and said second through hole formed in said control member adjacent its said second end, said third through hole formed in said fixed arm, said third through hole is in registration with said second through hole when the collapsible swing-out hitch mounted equipment carrier is in its collapsed position, said fourth through hole formed in said another bracket, said fourth through hole is in registration with said first through hole when the collapsible swing-out hitch mounted equipment carrier is in its extended position, said locking pin being sized and shaped to fit into said first, second, third and fourth through holes, said locking pin being fitted into said second and third through holes when the collapsible swing-out hitch mounted equipment carrier is in the collapsed position, said locking pin being fitted into said first and fourth through holes when the collapsible swing-out hitch mounted equipment carrier is in the extended position.

14. A collapsible swing-out hitch mounted equipment carrier that is configured to be detachably mounted to a vehicle, the swing-out hitch mounted equipment carrier movable between a collapsed position and an extended position, the swing-out hitch mounted equipment carrier comprising:

(a) a securing means for securing the swing-out hitch mounted equipment carrier to the vehicle;

(b) a fixed arm attached to said securing means;

(c) a swing arm;

(d) a first hinge attached to said fixed arm and one end of said swing arm, said first hinge permitting pivotal movement of said swing arm in a substantially horizontal plane relative to said fixed arm;

(e) an equipment carrier;

(f) a second hinge operatively connected to a free end of said swing arm and said equipment carrier, said second hinge permitting rotational movement of said equipment carrier relative to said swing arm, said equipment carrier constrained for rotational movement about a substantially vertical axis;

(h) a control member having first and second ends, said first end of said control member is pivotally connected to said fixed arm, said second end of said control member is pivotally connected to said second hinge, said control member governing pivoting movement of said swing arm relative to said fixed arm and rotational movement of said equipment carrier relative to said swing arm as the collapsible swing-out hitch mounted equipment carrier is moved from its collapsed position to its extended position and from its extended position to its collapsed position, said swing arm movable in a substantially horizontal plane and said equipment carrier rotating about a substantially vertical axis;

(g) a controller means being an assembly of intermeshing gears that includes a first gear, a set of idler gears and a second gear, said first gear is connected to said fixed arm, said series of idler gears rotatably connected to said swing arm, said second gear is rotatably connected to said swing arm and operatively connected to said equipment carrier, a diameter of said second gear is approximately twice the diameter of said first gear, said assembly of gears controlling the pivotal movement of said swing arm relative to said fixed arm and rotational movement of said equipment carrier relative to said swing arm, said assembly of gears being such that said equipment carrier moves in a clockwise direction relative to said swing arm when said swing arm moves in a counterclockwise direction and said equipment carrier moves in a counterclockwise direction relative to said swing arm when said swing arm moves in a clockwise direction.

15. The collapsible swing-out hitch mounted equipment carrier as claimed in claim 14 wherein the approximate ratio of movement of said swing arm to movement of said equipment carrier is approximately 2:1.

16. A swing-out hitch mounted equipment carrier that is configured to be detachably mounted to a trailer hitch receiver that is attached to a vehicle, the swing-out hitch mounted equipment carrier movable between a collapsed position and an extended position, the swing-out hitch mounted equipment carrier comprising:

(a) a securing means for securing the swing-out hitch mounted equipment carrier to the trailer hitch receiver;

(b) a fixed arm having first and second ends, said securing means securing said first end of said fixed arm to the vehicle;

(c) a swing arm having first and second ends, said first end of said swing arm pivotally connected to said second end of said fixed arm, said swing arm constrained for movement in a substantially horizontal plane, said swing arm in juxtaposition with said fixed arm when the swing-out hitch mounted equipment carrier is in the collapsed position;

(d) a bracket pivotally connected to said second end of said swing arm;

(e) an equipment carrier operatively connected to said bracket, said equipment carrier rotating with pivotal movement of said bracket;

(f) a control member in the form of an elongated bar having first and second ends, said first end of said control member pivotally connected to said fixed arm, said second end of said control member operatively connected to said swing arm, said control member controlling the pivotal movement of said swing arm relative to said fixed arm as the swing-out hitch mounted equipment carrier is moved between the collapsed and the extended positions; and (g) a holding means for holding the swing-out hitch mounted equipment carrier in the collapsed position, said holding means including a pull pin having an enlarged head with an extending finger, said extending finger movable between a retracted position and an extended position, said pull pin mounted to said fixed arm at said first end thereof, said finger, when in its extended position, is configured to engage said bracket for holding the swing-out hitch mounted equipment carrier in the collapsed position.

17. The collapsible swing-out hitch mounted equipment carrier as claimed in claim 8 wherein said locking means includes a locking pin and wherein said control member means includes a first through hole adjacent one end and a second through hole adjacent an opposite end, and wherein said fixed arm includes a third through hole that is in registration with said second through hole when the collapsible swing-out hitch mounted equipment carrier is in the closed position and wherein said first hinge bracket includes a fourth through hole that is in registration with said first through hole when the collapsible swing-out hitch mounted equipment carrier is in the opened position, said locking pin being sized and shaped to fit into said first, second, third and fourth through holes, said locking pin being fitted into said second and third through holes when the collapsible swing-out hitch mounted equipment carrier is in the closed position, said locking pin being fitted into said first and fourth through holes when the collapsible swing-out hitch mounted equipment carrier is in the opened position.

18. A collapsible swing-out hitch mounted equipment carrier that is configured to be detachably mounted to a vehicle, the swing-out hitch mounted equipment carrier movable between a collapsed position and an extended position, the swing-out hitch mounted equipment carrier comprising:

(a) a securing means for securing the swing-out hitch mounted equipment carrier to the vehicle;

(b) a fixed arm attached to said securing means;

(c) a swing arm;

(d) a first hinge means attached to said fixed arm and one end of said swing arm, said first hinge means permitting pivotal movement of said swing arm relative to said fixed arm;

(e) an upright vertical member;

(f) a second hinge means connected to a free end of said swing arm and said upright vertical member, said second hinge means permitting rotational movement of said upright vertical member about a substantially vertical axis relative to said swing arm;

(g) an equipment carrier attached to said upright vertical member;

(h) a control member means having first and second ends, said first end of said control member means pivotally connected to said fixed arm and said second end of said control member means pivotally connected to said second hinge means, said control member means controlling the pivotal movement of said swing arm relative to said fixed arm and rotational movement of said equipment carrier relative to said swing arm, said upright vertical member maintained in an upright position when the collapsible swing-out hitch mounted equipment carrier is moved between its collapsed position and its extended position; and (i) a locking means for locking the collapsible swing-out hitch mounted equipment carrier in its collapsed position and in its extended position, said locking means including a locking pin and said control member means including a first through hole adjacent its said first end and a second through hole adjacent its said second end, said fixed arm including a third through hole that is in registration with said second through hole when the collapsible swing-out hitch mounted equipment carrier is in its collapsed position, said first hinge means including a fourth through hole that is in registration with said first through hole when the collapsible swing-out hitch mounted equipment carrier is in its extended position, said locking pin being sized and shaped to fit into said first, second, third and fourth through holes.

19. A collapsible swing-out hitch mounted equipment carrier that is configured to be detachably mounted to a vehicle, the swing-out hitch mounted equipment carrier movable between a closed position and an opened position, the swing-out hitch mounted equipment carrier comprising:

(a) a securing means for securing the swing-out hitch mounted equipment carrier to the vehicle;

(b) a fixed arm having first and second ends, said securing means securing said first end of said fixed arm to the vehicle;

(c) a first hinge bracket;

(d) a swing arm having first and second ends, said first hinge bracket pivotally connecting said first end of said swing arm to said second end of said fixed arm, said swing arm constrained for movement in a substantially horizontal plane, said swing arm in juxtaposition with said fixed arm when the swing-out hitch mounted equipment carrier is in the closed position;

(e) a second hinge bracket with an extending finger is pivotally mounted to said swing arm at said second end thereof;

(f) a vertical member having upper and lower ends, said lower end of said vertical member is operatively connected to said second hinge bracket, said vertical member constrained for rotating movement about a substantially vertical axis, said vertical member rotating with pivotal movement of said second hinge bracket, said vertical member rotating when the swing-out hitch mounted equipment carrier is moved between the closed and opened positions;

(g) an equipment carrier attached to said vertical member;

(h) a control member means operatively connected to said fixed arm and said extending finger of said second hinge bracket, said control member means controlling the pivotal movement of said swing arm and rotational movement of said vertical member and said equipment carrier when the swing-out hitch mounted equipment carrier is moved between the closed and opened positions;

(i) one end of said first hinge bracket is connected to said fixed arm and an opposite end of said first hinge bracket is connected to said first end of said swing arm, said first hinge bracket permitting said swing arm to pivotally move relative to said fixed arm; and (j) a locking means for locking the collapsible swing-out hitch mounted equipment carrier in the closed position and in the opened position, said locking means including a locking pin, said control member means including a first through hole adjacent one end and a second through hole adjacent an opposite end, said fixed arm including a third through hole that is in registration with said second through hole when the collapsible swing-out hitch mounted equipment carrier is in the closed position, said first hinge bracket including a fourth through hole that is in registration with said first through hole when the collapsible swing-out hitch mounted equipment carrier is in the opened position, said locking pin being sized and shaped to fit into said first, second, third and fourth through holes, said locking pin being fitted into said second and third through holes when the collapsible swing-out hitch mounted equipment carrier is in the closed position, said locking pin being fitted into said first and fourth through holes when the collapsible swing-out hitch mounted equipment carrier is in the opened position.

* * * * *